United States Patent [19]

Quinby

[11] 4,039,199

[45] Aug. 2, 1977

[54] WHEEL CHAIR PUSH ROD APPARATUS

[76] Inventor: James D. Quinby, 81 Cedar Drive East, Briarcliff Manor, N.Y. 10510

[21] Appl. No.: 669,481

[22] Filed: Mar. 23, 1976

[51] Int. Cl.[2] .................. B62M 3/04

[52] U.S. Cl. .................. 280/242 WC; 74/546; 301/49

[58] Field of Search .................. 280/242 WC, 242, 211, 280/5.2, 289 WC, 249; 297/DIG. 4; 301/48, 49, 50, 51, 47; 74/558, 543, 546, 557

[56] References Cited

U.S. PATENT DOCUMENTS

| | | | |
|---|---|---|---|
| 221,255 | 11/1879 | Steel | 280/249 |
| 391,417 | 10/1888 | Lucas | 280/249 |
| 899,954 | 9/1908 | Cloyd | 301/48 |
| 1,201,315 | 10/1916 | Leinberger | 301/48 |
| 2,250,713 | 7/1941 | Johnson | 301/49 |
| 2,339,013 | 1/1944 | Higgins | 74/557 |
| 3,226,128 | 12/1965 | Grier | 301/47 X |
| 3,227,465 | 1/1966 | Massie | 280/5.2 |
| 3,301,574 | 1/1967 | Good | 280/242 WC |
| 3,869,146 | 3/1975 | Bulmer | 280/242 WC |

*Primary Examiner*—Joseph F. Peters, Jr.
*Assistant Examiner*—Jack D. Rubenstein
*Attorney, Agent, or Firm*—Witherspoon, Lane & Hargest

[57] ABSTRACT

This invention relates to push rod apparatus for propelling wheel chairs. Several different embodiments of the invention are disclosed. All the embodiments include a plurality of push rod mechanisms that provide the occupant with a means to propel a wheel chair in a forward and reverse direction. In addition, the push rod mechanisms of the various embodiments all include means to move the push rods away from and toward the center of the rear wheels of the wheel chair to which the push rods have been added. The push rods are extended away from the rear wheels of the wheel chair when in their uppermost position to place the push rods in a better position to be engaged by the occupant of the wheel chair and retract toward the center of the rear wheels in their lowermost position so that the push rods will not contact the surface on which the wheel chair is moving.

11 Claims, 9 Drawing Figures

WHEEL CHAIR PUSH ROD APPARATUS

BACKGROUND OF THE INVENTION

This invention relates to wheel chairs and, more particularly, to push rod mechanisms for propelling wheel chairs by the occupant of the wheel chair.

Conventional wheel chairs, foldable type or rigid frame type, are generally provided with hand rims that are attached to the rear wheels of the chair. These hand rims are used by the occupant of the wheel chair to propel the chair. If the occupant of the wheel chair has full use of his hands and arms, these hand rims provide a satisfactory means of propelling a wheel chair. However, if the occupant of the wheel chair has restricted or little or no use of his hands, the conventional push rim does not provide a satisfactory means even though such a person may be able to use his arms and/or his shoulder muscles to provide a force sufficient to propel a wheel chair. On many wheel chairs the hand rims do carry short push rods to help the occupant propel the wheel chair. However, these rods are short and not optimumly positioned.

Various other different propelling mechanisms have been devised to provide occupants of wheel chairs who have little or no use of their hands but do have use of their arm and/or shoulder muscles with a means to propel their wheel chairs. most of these prior art mechanisms known to the applicant use large single levers and many have relatively complicated mechanical linkages to provide the proper motion for the lever.

This invention provides occupant operated push rod apparatus to propel a wheel chair. The various embodiments of this invention provide mechanical advantages over the conventional push rims or push with the short fixed knobs and, in addition, the occupant of the wheel chair does not have to grasp the push rods to propel the wheel chair. All the occupant of a wheel chair needs to do to use the push rod apparatus of this invention is to apply a forward or reverse force on the push rods to move the wheel chair in the forward or reverse direction, respectively.

SUMMARY OF THE INVENTION

This invention relates to push rod apparatus for propelling a wheel chair. While several different embodiments of the invention are disclosed, all of the embodiments include a plurality of push rods operatively associated with the push rims on each side of the wheel chair. If the occupant of the wheel chair applies a force on the push rods in a forward direction, the wheel chair moves in the forward direction and conversely, if the occupant applies a force on the push rods in a backward direction, the wheel chair will move backwards. In each embodiment of this invention means are provided to move each push rod away from or toward the axis of the push rim associated with that push rod so that each push rod is retracted toward its associated push rim when the push rod is in its lowermost position and each push rod is moved in a direction away from the outer edge of its associated push rim when that push rod is in its uppermost position. Each push rod is retracted toward the center of its associated push rim when it is in its lowermost position so that the push rods will not contact the surface upon which the wheel chair is moving and is extended away from its associated push rim when in the uppermost position to place the push rod in a better position for engagement by the occupant of the wheel chair.

BRIEF DESCRIPTION OF THE DRAWING

A full and complete understanding of the invention can be obtained from the following detailed description of the invention when read in conjunction with the annexed drawing in which.

DETAILED DESCRIPTION OF THE INVENTION

Figure 1:
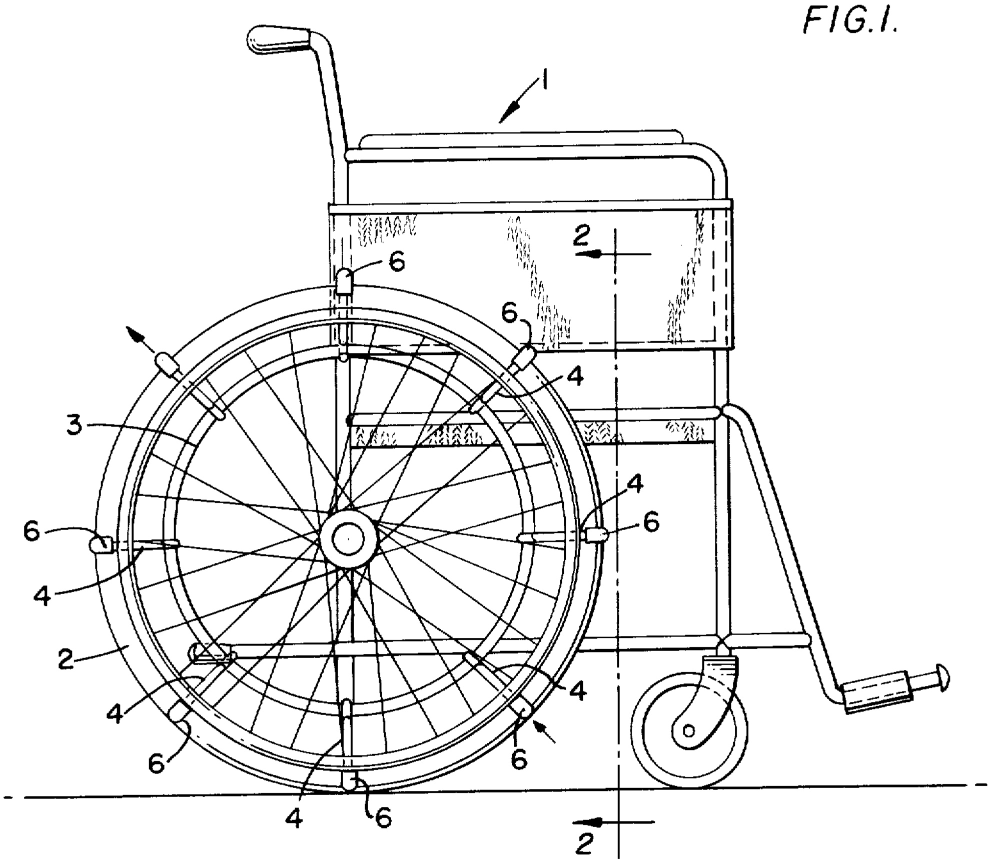
FIG. 1 is a side view of a conventional wheel chair with a first embodiment of the push rod apparatus of this invention added to the wheel chair.
Figure 2:
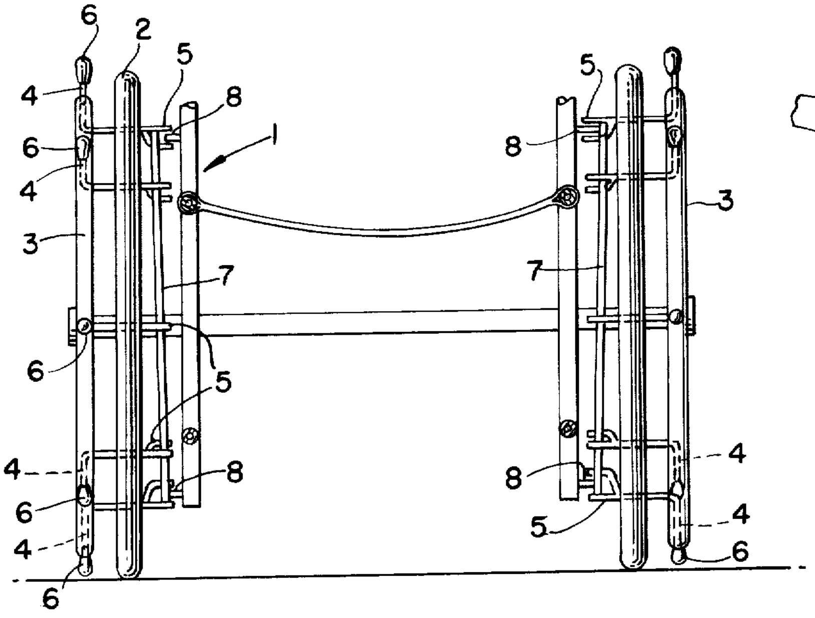
FIG. 2 is a fragmented view of the wheel chair and push rod apparatus of FIG. 1 taken along the line 2—2 of FIG. 1.
Figure 3:
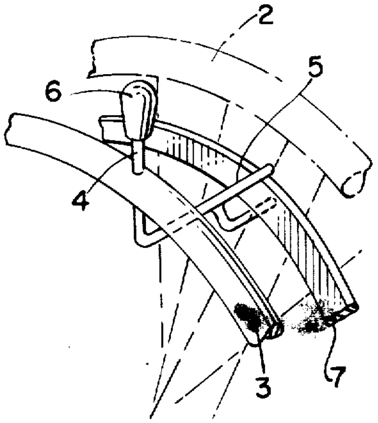
FIG. 3 is a detailed view of a segment of the push rod apparatus of FIGS. 1 and 2.

Referring to FIGS. 1, 2 and 3, the wheel chair 1 is any conventional wheel chair, either of the rigid frame type or the collapsible frame type. Note that as shown in FIGS. 1 and 2, wheel chair 1 is not collapsable. However, the precise structure of the basic wheel chair does not form a part of this invention; therefore, it is to be understood that the various embodiments of this invention can be added to any conventional wheel chair. Such conventional wheel chairs have a pair of large rear wheels 2, one located on each side of the wheel chair. These rear wheels 2 usually have rubber tires. These conventional wheel chairs also usually have a pair of push rims 3, one associated with each of the rear wheels 2 and extending beyond its associated rear wheel as shown in FIGS. 1 and 2. To propel the wheel chair, the occupant grasps the push rims and provides a forward or backward force to move the wheel chair forward or in reverse, respectively.

Instead of using the push rims 3 to propel wheel chair 1, the push rod apparatus of this invention is utilized. As shown in FIGS. 1, 2 and 3, the push rod apparatus of the first embodiment of this invention includes a plurality of push rods 4 equally spaced around each of the push rims 3. While FIG. 1 shows eight push rods equally spaced around one of the push rims 3, any number of such push rods can be provided with, of course, the same number of push rods being provided on each side of the wheel chair. While any number of push rods can be provided, from a practical standpoint, the number of push rods provided should probably not be less than four or more than sixteen. If less than four push rods are provided, the spacing between rods becomes too great and if more than sixteen push rods are provided, the spacing between rods will be so small that the next rods in line may interfere with the occupant as he propels the wheel chair by pushing on one of the rods.

As shown more clearly in FIG. 3, each of the push rods 4 is generally L-shaped and has a fork 5 formed at one end thereof. Evenly spaced holes are drilled through each of the push rims 3 and the straight end, the end not having the fork 5, of each of the push rods 4 is slipped through a different one of the holes drilled in the push rims 3. A suitable knob 6 is then secured to each of the push rods 4. The knobs 6 may be made of any suitable material and are secured to push rods 4 by any suitable means. Conveniently, the end of each of the push rods 4 can be threaded and each of the knobs 6 will then have a threaded hole so that the knobs 6 can be screwed onto the push rods 4. In this manner, a knob 6 can be conveniently replaced if a knob breaks or wears out.

A separate cam 7 is secured to each side of the frame of wheel chair 1 between the chair frame and the rear wheel 2 on that side of wheel chair 1. In FIG. 2, the rods or elements 8 are shown as securing the cams 7 to the chair frame. These rods or elements 8 may be welded to the cams 7 and the chair frame or may be secured to cams 7 and the chair frame by any other suitable means. Further, any other suitable means can be used to secure cams 7 to the chair frame. As shown in FIG. 2, the cams 7 are so secured to the chair frame that the top of each of the cams 7 is closer to associated rear wheel 2 than at the bottom. That is, each of the cams 7 is slightly tilted so that the top of each cam 7 is closer to the associated rear wheel 2 and the bottom is closer to the chair frame. The reason for so tilting the cams 7 will be described later. Also, the cams 7 are not concentric with the rear wheels 2 as is shown in FIG. 1. That is, each of the cams 7 is off-set such that the distance between the edge of each of the rear wheels 2 and the outside surface of the associated cam 7 is greater at the bottom then at the top. The reason for this off-set will become apparent.

As is shown in FIGS. 2 and 3, the forks 5 of the push rods 4 slip over the cams 7 such that one tine of each fork 5 rides on the inside edge of its associated cam 7 while the other tine rides on the outside edge. Note that while the cams 7 are shown as being generally ring-shaped with the tines of the forks 5 riding on the narrow edges, the cams 7 could be generally ringshaped but with the wide surfaces of the cams 7 being horizontal rather than verticle. If the cams 7 are so shaped, the tines of the forks 5 would ride on the wide surfaces rather than the narrow edges as shown. In fact, as will become evident, the cams 7 can have any suitable design that will provide the proper motion to the push rods 4.

The push rods 4 are used by the occupant of the wheel chair to propel the wheel chair in either a forward or backward direction in the following manner: The occupant of the wheel chair pushes on the knob 6 of the uppermost push rod 4. This can be done without tightly grasping the knob 6. Assuming he wishes to move the chair forward, he pushes in a forward direction. The chair then moves forward and this push rod 4 moves away from the occupant while the following push rod 4 moves into its uppermost position so that this following push rod 4 can now be used to propel the chair. Thus, push rod 4 after push rod 4 moves into the uppermost position rod after rod as the chair moves forward and the occupant pushes on each rod as it moves through this uppermost position to keep the chair moving. Of course, the same procedure is used in reverse to move the chair in a backward direction and if the occupant wishes to turn the chair he merely pushes the push rods 4 on one side in one direction while pushing the push rods 4 on the other side in the opposite direction.

As a push rod 4 reaches its lowermost position it must obviously be so positioned relative to its associated rear wheel 2 that it can clear the floor. The cams 7 and the fork 5 of each push rod 4 provides the required movement of the push rods 4 relative to the rear wheels 2 to enable the push rods 4 to clear the floor when in their lowermost position. As a push rod 4 rotates, its fork 5 is guided by its associated cam 7. Any movement of a fork 5 away from or toward the axis of its associated push rim 3 is translated to its push rod 4 and causes that portion of push rod 4 that passes through the associated hole in push rim 3 and thus the knob 6 to move in the same direction. This portion of each of the push rods 4 is smaller in diameter than the diameter of the associated hole in push rim 3 and is therefore free to slide in its hole in push rim 3. The push rims 3 are concentric with their associated rear wheels 2 but the cams 7 are off-set from the axes of their associated rear wheels 2 such that the distance between the outer edge of a rear wheel 2 and the outer edge of its associated cam 7 is greater at the bottom of each cam 7 than at the top. Thus, as each push rod 4 rotates toward the bottom of its cam 7, its fork 5 is drawn toward the center of the push rim 3 by cam 7 and is closest to the center of its push rim 3 when at the bottom of its cam 7. Since the knob 6 of each push rod 4 moves in the same direction as its fork 5, the knob 6 will be retracted toward the axis of its associated rim 3 when the push rod 4 is in its lowest position. Each cam 7 is off-set a sufficient amount to cause knobs 6 of each push rod 4 to move inward a sufficient amount to provide clearance between each knob 6 and the surface upon which the wheel chair is moving when a push rod 4 approaches and is at its lowest point. As each push rod 4 passes through its lowest point and then begins to rotate to its highest point, its fork 5 riding in its cam 7 begins to move away from the axis of the associated push rim 3 and is at its furtherest point away from the axis of its push rim 3 when it is at the top of its cam 7; therefore, knob 6 of each push rod 4 will be at its furtherest point away from its associated push rim 3. This extending of knob 6 of each push rod 4 away from its push rim 3 moves the knob 6 into a convenient position for the occupant of the wheel chair to push on that knob 6. In summary, then the occupant of the wheel chair 1 applies a force to each knob 6 as each knob 6 moves into its uppermost position. At this point cam 7 has moved the knob 6 away from its push rim 3 and toward the occupant and as each push rod 4 moves through its lowest point its knob 6 is retracted toward its push rim 3 so that knob 6 clears the surface upon which the wheel chair is moving. Thus, the occupant propels wheel chair 1 by pushing on knobs 6 of push rods 4 one at a time as each knob 6 is brought into position by its push rim 3 and its cam 7 and each push rod 4 is retracted at the lowest point of travel and extended at its highest point of travel by the interaction of each cam 7 and the forks 5 of the push rods 4.

Figure 4:
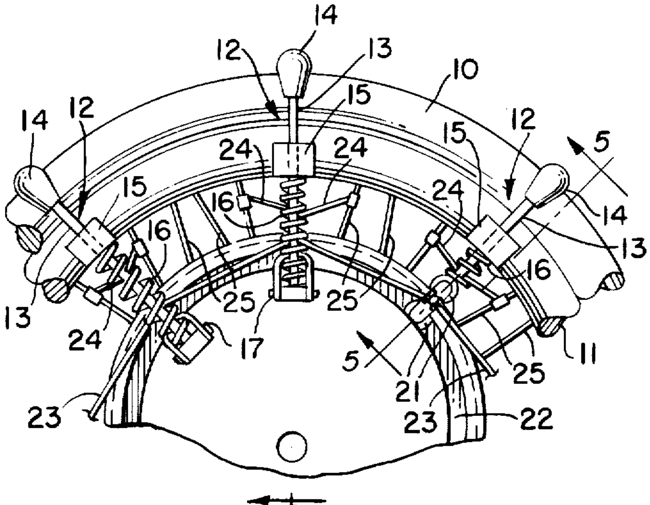
FIG. 4 shows a second embodiment of the push rod apparatus of the invention.
Figure 5:
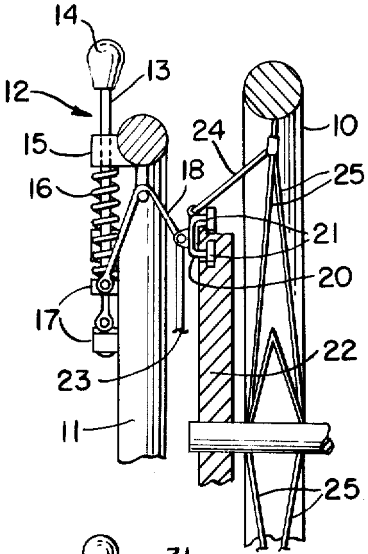
FIG. 5 is a view of the second embodiment of the invention taken along the line 5—5 of FIG. 4.

FIGS. 4 and 5 show a second embodiment of the invention. In these Figures only a portion of a single rear wheel 10 and the associated push rim 3 of a wheel chair 1 are shown. In addition, only three push rods, the push rods 12, are shown in FIG. 4 and only one of the push rods 12 is shown in FIG. 5. In practice, a plurality of push rods 12 (preferably no less than 4 or more than 16) will be equally spaced around push rim 11 as in the case in the embodiment of FIGS. 1, 2 and 3 and such push rods 12 will be provided on each side of the wheel chair. Each push rod 12 includes a rod 13, a knob 14 secured to one end of rod 13, a spring 16 and a keeper 17. A separate collar 15 surrounds each rod 13 between its knob 14 and its spring 16. Each support collar 15 has a hole drilled therethrough of sufficient diameter to permit the associated rod 13 to move up and down freely in the hole in the support collar 15. Each support collar 15 is secured to the push rim 11. A cable 17 is secured at one end to keeper 17, passes over a retainer 18 secured to rim 11 and is secured to fork arrangement 20 at its other end. Each fork arrangement 20 has a pair of rollers or bearings 21 that ride in a cam 22. One of the push rods 12, the push rod 12 on the right in FIG. 4, is broken away to show rollers 21. Each fork 20 is tied to the next fork by means of a section of cable 3 and to a trailing and a leading spoke 25 by means of the separate cables 24. Not all of the forks 20 need to be tied to the spokes 25. The tying of every other fork 20 to the spokes 25 should be sufficient.

Spring 16 of each push rod 12 operates to urge the push rod 12 toward keeper 17. Cam 22 is off-set from the axis of the push rim 11 and thus from the axis of the wheel 10. However, in this case the off-set is exactly opposite the off-set of cam 7 of FIGS. 1, 2 and 3. That is, the outer surface of cam 22 is closer to the edge of wheel 10 at its bottom than at its top. In addition, cam 22 has a lip to retain the rollers or bearings 21 while cam 7 of FIGS. 1, 2 and 3 does not have a lip.

The operation of the embodiment is similar to the operation of the embodiment of FIGS. 1, 2 and 3 in that the occupant of the wheel chair pushes on push rods 12 one at a time to propel the wheel chair; however, in this embodiment spring 16 in conjunction with cam 22 and the cam followers comprised of forks 20 and rollers or bearings 21 of each push rod 12 cooperate to retract the rods at their lowermost position and extend them at their uppermost position. When a push rod 12 is at the top, the outer surface of cam 22 is at its furtherest distance from the surface of push rim 11; therefore, its cable 18 is pulled downward and thus push rod 12 is urged upward away from the push rim 11 against its spring 16. When a push rod 12 is at its lowest position cable 18 moves in the direction away from cam 22 since the outer surface of cam 22 is at its closest distance from the surface of push rim 11. When cable 18 of a push rod 12 moves in thus, this push rod 12 is urged inward by its spring 16 and will therefore clear the surface upon which the wheel chair is moving.

Figure 6:
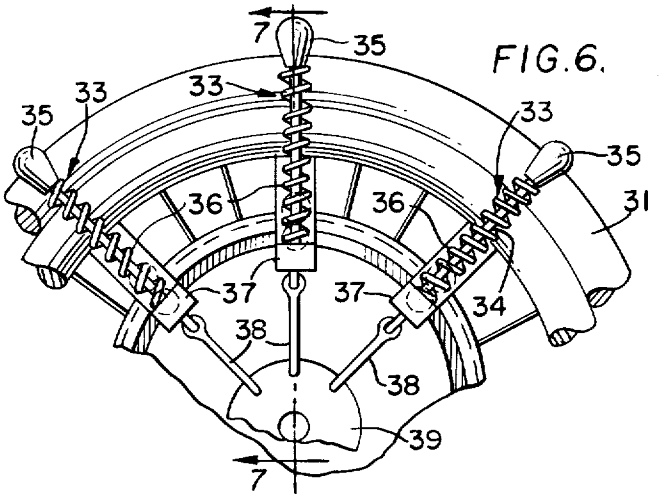
FIG. 6 shows a third embodiment of the push rod apparatus of the invention.
Figure 7:
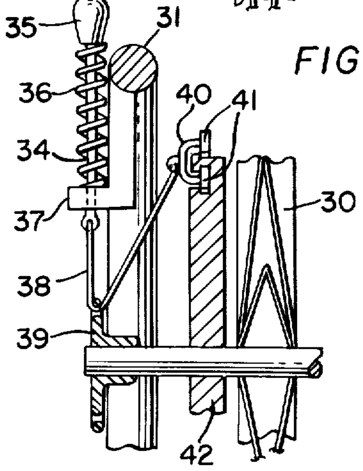
FIG. 7 is a view of the third embodiment taken along the line 7—7 of FIG. 6.

FIGS. 6 and 7 show a third embodiment of the invention. This third embodiment is a variation of the second embodiment. FIGS. 6 and 7 show only a part of one of the rear wheels, the wheel 30, a part of the associated push rim 32 and a few of the push rods 33, In practice, a plurality of push rods 33 (peferably not less than 6 nor more than 10) are equally spaced around push rim 31 and, of course, such a plurality of push rods are provided on both sides of the wheel chair.

As shown in FIGS. 6 and 7, each push rod 33 includes a rod 34, a knob 35 secured to one end of rod 34, a keeper 37 and a spring 36 surrounding rod 34 and located between keeper 37 and and knob 35. Keeper 37 of each push rod 33 is secured to rim 31 by any suitable means.

Rod 34 of each push rod 33 passes through a hole drilled in its keeper 37. The hole drilled in each keeper 37 is of a sufficient diameter to permit its rod 34 to freely slide up and down in keeper 37. The end of each rod 34 that extends beyond its keeper 37 is formed into an eyelet. Each rod 34 has a cable 38 secured at one end to its eyelet. Each cable 38 extends away from its rod 34 and passes through a separate hole drilled in the hub plate 39. After passing through its hole in hub plate 38, each cable 38 is brought up toward its associated push rod 33 and secured to a separate fork 40. Each fork 40 has a pair of rollers or bearings 41 that ride on the cam 42. The configuration of cam 42 is identical to the configuration of cam 22 of FIGS. 4 and 5; however, cam 42 is off-set in the opposite direction from cam 22 of FIGS. 4 and 5. That is, the outer surface of cam 42 is closer to the outer surface of push rim 31 at the top than at the bottom. This off-set of cam 42 is identical to the off-set of cam 7 of FIGS. 1, 2 and 3.

As is the case with the first two embodiments, the occupant of a wheel chair merely pushes on push rods 33 one at a time to propel the wheel chair. It is noted that while not shown in FIGS. 6 and 7, a cable arrangement identical to the cables 3 and 24 of FIGS. 4 and 5 is provided in the embodiment of FIGS. 6 and 7 to tie one fork 40 to the next fork 40 and to tie each fork 40 or a number of the forks 40 to the spokes. These cables are not shown in FIGS. 6 and 7 in order to avoid cluttering. Spring 36 of each push rod 33 urges the knob 35 of each push rod 33 away from its keeper 37. When a push rod 33 is in its uppermost position, its fork 40 is at its closest distance from the surface of push rim 31 and its spring 36 is free to move its knob 35 away from its keeper 37. When a push rod 33 moves to its lowest position, its cable 38 is pulled toward cam 42 due to the off-set of cam 42. This motion of cable 38 causes its associated rod 34 to move toward hub 39 thereby retracting knob 35 of that push rod 33 toward its keeper 37 thereby allowing that push rod 33 to clear the surface upon which the wheel chair is moving. Thus, as each push knob rotates, it is retracted against its spring 36 by the action of its cable 38, cam follower consisting of its fork 40 and bearings or rollers 41, and cam 42 and as this push rod moves to its uppermost position, it is extended to its fullest away from its keeper 37 under the action of its spring 36 and the action of its cam follower and cam 42.

Figure 8:
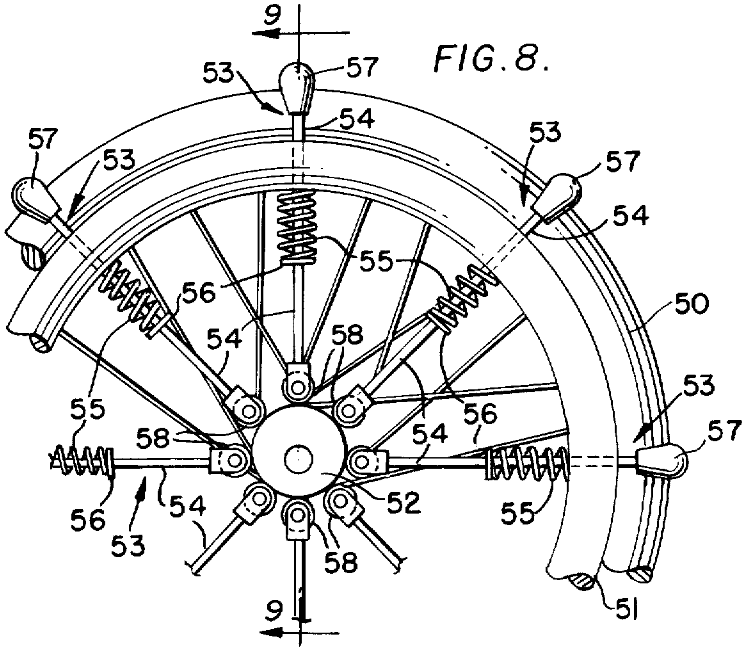
FIG. 8 shows a fourth embodiment of the push rod apparatus of the invention.
Figure 9:
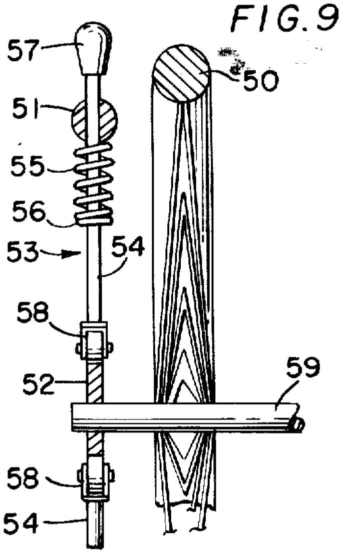
FIG. 9 is a view of the fourth embodiment of the invention taken along the line 9—9 of FIG. 8.

FIGS. 8 and 9 show still another embodiment of the invention. Again, only a part of one rear wheel, the wheel 50 of a wheel chair and its associated push rim 51 is shown. This embodiment also includes a plurality of push rods 53, only four of which are fully shown. FIG. 4 does, however, show that eight push rods 53 are equally spaced around push rim 51. Again, the exact number of push rods 53 provided is not critical but for obvious reasons, the number of push rods provided should not be less than six nor more than ten and, of course, a plurality of push rods 53, equal in number, are provided on both sides of the wheel chair.

As shown in FIGS. 8 and 9, push rods 53 each comprise a rod 54, a spring 55, a keeper 56, a knob 57 secured to one end of rod 54 and a roller bearing 58 secured to the other end of rod 54.

Push rim 51 has a plurality of holes, equal in number to the number of push rods 53. The rods 54 of push rods 53 each pass through a different one of the holes in push rim 51 as shown in FIGS. 8 and 9. The holes in push rim 51 are of sufficient diameter to permit rods 54 to freely move up and down in the holes and spring 55 of each push rod 53 is retained in place by push rim 51 and the associated keeper 56. Roller bearings 58 ride on a cam 52 secured to the axle 59. Cam 52 is not concentric with axle 59. That is, the distance between the center of axle 59 and the top of cam 52 is greater than the distance between the bottom of cam 52 and the center of axle 59. Cam 52, of course, does not rotate with wheel 50 and push rim 51.

As is the case in the other three embodiments, the occupant of a wheel chair propels the chair by merely pushing on the push rods 53 one at a time as a rod comes into position. As a push rod approaches its uppermost level, the push rod 53 will be pushed upward by the action of cam 52 and roller bearing 58. This upward movement of the push rod causes its spring 55 to be compressed. As this push rod approaches its lowermost point, it moves inward toward axle 59 under the influence of its spring 55 and the action of cam 52 and roller bearing 58 of that push rod. Thus, as the occupant of the wheel chair pushes on push rods 53, one at a time, push rods 53 rotate around cam 52 and move inward and outward as they pass from their lowest position to their highest position, respectively.

While the invention has been described with reference to four specific embodiments, it will be apparent to those skilled in the art that various changes and modifications can be made to these specific embodiments without departing from the spirit and scope of this invention as set forth in the claims.

What is claimed is:

1. On a wheel chair having a first rear wheel and a first push rim located on one side of said wheel chair and a second rear wheel and a second push rim located on the other side of said wheel chair, a push rod system used by the occupant of said wheel chair to propel said wheel chair, said push rod system comprising:

a first plurality of push rods equally spaced around said first push rim;

a second plurality of push rods equally spaced around said second push rim, said second plurality of push rods being equal in number to said first plurality of push rods;

a first cam located on said one side of said wheel chair and secured to said wheel chair;

a second cam located on said other side of said wheel chair and secured to said wheel chair;

separate cam followers operatively associated with each of said first and second plurality of push rods, each of said separate cam followers operatively associated with said first plurality of push rods being guided by said first cam and each of said separate cam followers associated with said second plurality of cam followers being guided by said second cam, said first and second cams being so designed that each of said first plurality of push rods extends in a direction away from said first push rim when in its uppermost position and retracts in a direction toward said first push rim when in its lowermost position and said second cam being so designed that each of said second plurality of push rods extends in a direction away from said second push rim when in its uppermost position and retracts in a direction toward said push rim when in its lowermost position.

2. The push rod system as defined in claim 1 wherein each of said plurality of first and second push rods comprises: an L-shaped rod having a fork formed at the end of one leg of said L-shape, said fork forming said separate cam follower, said fork of each of said first plurality of push rods mating with said first cam and said fork of each of said second plurality of push rods mating with said second cam; a knob secured to the end of the other leg of said L-shape; and wherein said first and second push rims each have a plurality of holes drilled therethrough equal in number to said first and second plurality of push rods, said other leg of said L-shape of each of said first plurality of push rods passing through a different one of said plurality of holes drilled in said first push rim and said other leg of said L-shape of each of said second plurality of push rods passing through a different one of said plurality of holes drilled in said second push rim.

3. The push rod system as defined in claim 1 wherein said first and second plurality of push rods each comprises:

a cylindrical rod;

a knob secured to one end of said cylindrical rod;

a collar slipped over said cylindrical rod, a keeper secured to the other end of said cylindrical rod and a spring surrounding said rod and being located between said collar and said keeper.

4. The push rod system as defined in claim 3 wherein each collar of said first plurality of push rods is secured to said first push rim and each collar of said second plurality of push rods is secured to said second push rim.

5. The push rod system as defined in claim 4 wherein said separate cam follower operatively associated with each of said first and second plurality of push rods comprises a U-shaped member with a bearing secured to the end of each leg of said U-shaped member, each cam follower of said first plurality of push rods mating with said first cam and each cam follower of said second plurality of push rods mating with said second cam and wherein each cam follower mating with said first cam is coupled to a different one of said first plurality by means of a separate cable and each said cam follower mating with said second cam is coupled to a different one of said second plurality of push rods by a separate cable.

6. The push rod system as defined in claim 1 wherein said first and second plurality of push rods each comprise:

a cylindrical rod;

a knob secured to one end of said cylindrical rod;

a keeper surrounding said cylindrical rod and being located adjacent the other end of said cylindrical rod; and a spring surrounding said cylindrical rod and being located between said collar and said knob, said collar of each of said first plurality of push rods being secured to said first push rim and said collar of each of said second plurality of push rods being secured to said second push rim.

7. The push rod system as defined in claim 6 wherein said separate cam followers operatively associated with each of said plurality of first and second push rods each comprises a U-shaped member having a separate bearing secured to the end of each leg of said U-shape, said separate cam followers operatively associated with said first plurality of push rods mating with said first cam and said separate cam followers operatively associated with said second plurality of push rods mating with said second cam follower.

8. The push rod system as defined in claim 7 wherein each of said separate cam followers mating with said first cam is coupled to a different one of said first plurality of push rods by a separate cable and each of said separate cam followers mating with said second cam is coupled to a different one of said second plurality of push rods by a separate cable.

9. The push rod system as defined in claim 1 wherein said first push rim has a plurality of holes equal in number to said first plurality of push rods and said second push rim has a plurality of holes equal in number to said second plurality of push rods.

10. The push rod system as defined in claim 9 wherein each push rod of said first plurality of push rods comprises:

a cylindrical rod passing through one of said holes in said first push rim;

a knob secured to one end of said cylindrical rod;

a keeper secured at approximately the mid-point of the length of said cylindrical rod; and a spring surrounding said cylindrical rod and being located between said first push rim and said keeper; and wherein each push rod of said second plurality of push rods comprises:

a cylindrical rod passing through one of the holes of said second push rim;

a knob secured to one end of said cylindrical rod;

a keeper secured at approximately the mid-point of the length of said cylindrical rod; and a spring surrounding said cylindrical rod and being located between said second push rim and said keeper.

11. The push rod system as defined in claim 10 wherein each separate cam follower associated with said first plurality of push rods is secured to the other end of said cylindrical rod of a different one of said first plurality of push rods and each separate cam follower associated with said second plurality of push rods is secured to the other end of said cylindrical rod of a different one of said second plurality of push rods; said separate cam followers associated with said first plurality of push rods mating with said second cam and said separate cam followers associated with said second plurality of push rods mating with said second cam.

* * * * *